(12) United States Patent
Yousuf

(10) Patent No.: US 9,436,630 B2
(45) Date of Patent: Sep. 6, 2016

(54) USING DUAL PHYS TO SUPPORT MULTIPLE PCIE LINK WIDTHS

(71) Applicant: Western Digital Technologies, Inc., Irvine, CA (US)

(72) Inventor: Farooq Yousuf, Mission Viejo, CA (US)

(73) Assignee: Western Digital Technologies, Inc., Irvine, CA (US)

(*) Notice: Subject to any disclaimer, the term of this patent is extended or adjusted under 35 U.S.C. 154(b) by 538 days.

(21) Appl. No.: 14/026,062

(22) Filed: Sep. 13, 2013

(65) Prior Publication Data

US 2014/0365704 A1    Dec. 11, 2014

Related U.S. Application Data

(60) Provisional application No. 61/833,772, filed on Jun. 11, 2013.

(51) Int. Cl.
*G06F 13/16* (2006.01)
*G06F 13/28* (2006.01)

(52) U.S. Cl.
CPC .......... *G06F 13/28* (2013.01); *G06F 13/1689* (2013.01); *G06F 13/1694* (2013.01)

(58) Field of Classification Search
CPC . G06F 13/28; G06F 13/1689; G06F 13/1694
See application file for complete search history.

(56) References Cited

U.S. PATENT DOCUMENTS

| | | | |
|---|---|---|---|
| 6,856,556 B1 | 2/2005 | Hajeck | |
| 7,126,857 B2 | 10/2006 | Hajeck | |
| 7,293,125 B2 | 11/2007 | McAfee et al. | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,676,613 B2 | 3/2010 | Bashford et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |

(Continued)

FOREIGN PATENT DOCUMENTS

WO    2012169820 A2    12/2012

OTHER PUBLICATIONS

International Search Report and Written Opinion dated Oct. 28, 2014 from related PCT Serial No. PCT/US2014/042007, 14 pages.

(Continued)

*Primary Examiner* — Glenn A Auve
(74) *Attorney, Agent, or Firm* — Shumaker & Sieffert, P.A.

(57) ABSTRACT

Systems described herein enable PCIe device components to be used with multiple PCIe topologies and with host systems of varying configurations. In some cases, a number of varying PHYs and PCIe cores are utilized to increase the number of applications and/or specifications that may be satisfied with a host interface design. Further, some systems described herein may include a number of synchronizers, clock multiplier units, and selectors to create a host interface that can be configured for a number of applications. Despite increasing the flexibility of the usage of systems disclosed herein, costs can be reduced by using the systems of the present disclosure for PCIe based devices.

28 Claims, 8 Drawing Sheets

(56) References Cited

U.S. PATENT DOCUMENTS

| | | |
|---|---|---|
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,722 B1 | 1/2012 | Liao et al. |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,151,037 B1 | 4/2012 | Zhou et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2006/0168377 A1 | 7/2006 | Vasudevan et al. |
| 2009/0049222 A1 | 2/2009 | Lee et al. |
| 2010/0174849 A1 | 7/2010 | Walston et al. |
| 2010/0250793 A1 | 9/2010 | Syu |
| 2011/0099323 A1 | 4/2011 | Syu |
| 2011/0235459 A1* | 9/2011 | Ware .................. G11C 7/04 365/233.11 |
| 2011/0283049 A1 | 11/2011 | Kang et al. |
| 2011/0320690 A1 | 12/2011 | Petersen et al. |
| 2012/0011302 A1 | 1/2012 | Bruening et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0311256 A1 | 12/2012 | Nakajima et al. |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

SFF Committee, "SFF 8639 Specification for Multifunction 12 Gb/s 6x Unshielded Connector", rev 1.6, Nov. 28, 2012, 29 pages.
SSD Form Factor Working Group, "Enterprise SSD Form Factor", ver 1.0, Dec. 20, 2011, 56 pages.

* cited by examiner

USING DUAL PHYS TO SUPPORT MULTIPLE PCIE LINK WIDTHS

RELATED APPLICATIONS

This disclosure claims priority to U.S. Provisional Application No. 61/833,772 filed Jun. 11, 2013 and titled "USING DUAL PHYS TO SUPPORT MULTIPLE PCIE LINK WIDTHS," the disclosure of which is hereby incorporated by reference in its entirety.

BACKGROUND

1. Technical Field

This disclosure relates to non-volatile storage subsystems, including but not limited to flash drives. More particularly, the disclosure relates to systems and methods for non-volatile storage subsystems that use Peripheral Component Interconnect Express (PCIe) connectors for communicating between a storage device controller and a root complex of a host system.

2. Description of the Related Art

PCIe is a standard for high speed serial expansion cards that is designed to replace a number of older standards including the PCI standard and the AGP standard. PCIe may be used for a variety of expansion cards including graphics cards and network cards. Further, the PCIe standard may be used for solid state drives.

Devices compliant with the PCIe standard may include a variety of components and may come in a number of sizes and form factors. For example, PCIe compliant devices may include one lane, four lanes, or sixteen lanes. Further, PCIe compliant devices may be designed as mini cards, which can be used with laptops.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

Overview

As described above, Peripheral Component Interconnect Express (PCIe) compliant devices may come in a variety of sizes and forms. Further, the PCIe standard may be used with a variety of types of devices including solid state drives and graphics cards. Generally, PCIe compliant devices come with a number of components that are application specific. However, despite being application-specific, many PCIe complaint devices may share similar types of components. For example, a number of PCIe compliant devices may include a host interface that is designed to facilitate communication between the host system via one or more root complexes and the PCIe device. Although some PCIe compliant devices share component types, each component is separately designed because the sub-components may be application specific and do not enable flexibility of use.

Some embodiments of the present disclosure relate to host interface designs that provide the flexibility to be used with a variety of PCIe compliant devices, which may have varying number of associated root complexes. In some embodiments, the flexible host interfaces can reduce one or more costs associated with a PCIe device. This reduced cost can be achieved in some cases despite increasing the flexibility of the host interfaces.

Some embodiments presented herein utilize physical interfaces (PHYs) of varying sizes and, in some cases, PCIe cores of varying sizes thereby enabling the host interface to be used with a variety of systems and PCIe topologies. For example, some embodiments described herein may be used with host devices that have one, two, or more root complexes without redesigning the host interface for each host. The PHYs disclosed herein may include PCIe PHYs.

Although, to simplify discussion, the present disclosure is described in terms of PCIe, the disclosure is not limited as such. For example, the present disclosure may be utilized with any type of serial interface, including a high speed serial interface. Further, the present disclosure may be used with any type of device and/or card that includes a serial interface and one or more processing cores.

System Overview

Figure 1A:
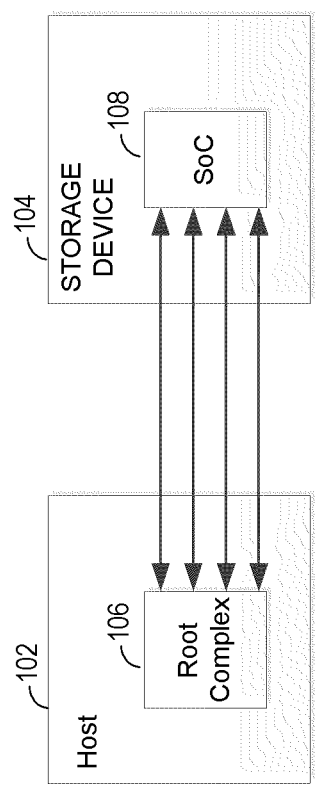
FIG. 1A is a block diagram illustrating an example of a host system in communication with a storage device via a x4 PCIe link.

FIG. 1A is a block diagram illustrating an example of a host system 102 in communication with a storage device 104 via a x4 PCIe link. In one embodiment, the storage device 104 may be a SSD, a hard disk drive, a hybrid disk drive, or any other data storage device. The host system 102 may include any computing device that may communicate with a storage device. As shown, the host system 102 may include a root complex 106 that communicates with the storage device by communicating with a System on Chip (SoC) 108 of the storage device 104. The root complex 106 can include any system that can facilitate processing memory access commands by, for example, generating transaction requests on behalf of a process. The storage device 104 can include any type of storage media that may include one or more non-volatile solid state memory arrays 160 (illustrated in FIG. 1B). In some embodiments, other types of media such as rotating magnetic media may be used in place of, or in addition to, the solid state memory. The SoC 108 can include one or more components for interacting with the storage device 104 and the non-volatile solid state memory arrays 160.

Figure 1B:
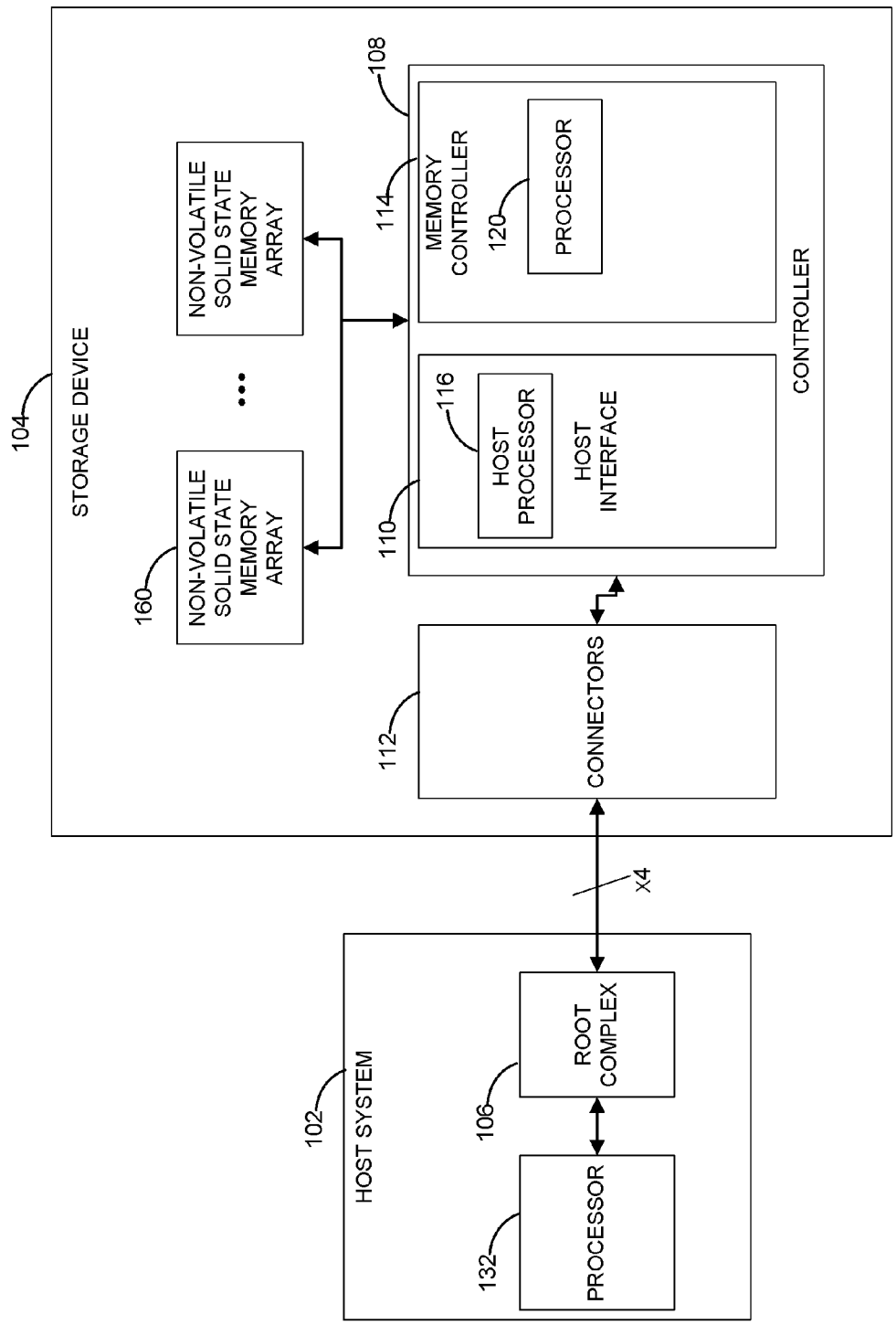
FIG. 1B is a block diagram illustrating a more detailed example of the host system in communication with the storage device illustrated in FIG. 1A.

Further details of the storage device 104 and the SoC 108 are illustrated in FIG. 1B, which is a block diagram illustrating a more detailed example of the host system 102 in communication with the storage device 104. As shown in FIG. 1B, the host system 102 may include a processor 132 in addition to the root complex 106. The processor may issue memory access commands and handle data traffic to/from the storage device 104. In some cases, the root complex 106 may act as an intermediary by allowing the processor 132 to off-loading at least partial processing of memory access requests to the root complex 106. Although illustrated as two separate components, in some cases, the root complex 106 may be included as part of the processor 132.

As previously stated, the storage device 104 may include a number of non-volatile solid state memory arrays 160. The arrays may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM chips. The solid state storage devices may be physically divided into blocks, pages and sectors, as is known in the art. Other forms of storage (e.g., battery backed-up volatile DRAM or SRAM devices, magnetic disk drives, etc.) may additionally or alternatively be used.

The storage device 104 may include connectors 112 that communicate signals from the root complex 106 to the SoC 108 and vice versa. The connectors 112 may be physical connectors, such as PCIe connectors or differential input/output connectors. The signals may include both memory access commands and data.

In some cases, the SoC 108 may function as a controller. The SoC 108 may include at least a host interface 110 and a memory controller 114. Although not shown, the SoC 108 may include additional components that facilitate the management of and access to the non-volatile solid state memory arrays 160. For example, the SoC 108 may include Error Correcting Code (ECC) systems.

The host interface 110 can include any system for receiving signals from the root complex 106 via the connectors 112 and preparing the signals for processing by the memory controller 114. These signals may include memory access commands and data for storage in the non-volatile solid state memory array 160. Further, the host interface 110 may be configured to process signals received from the memory controller 114 for provisioning to the root complex 106. In some cases, the host interface may include a host processor 116. The host processor 116 may include any system that can facilitate the processing of signals received at the host interface 110. More details regarding the host interface 110 are described below with respect to the FIG. 1C.

The memory controller 114 can include any system for communicating with the non-volatile solid state memory array 160. The memory controller 114 may access the non-volatile solid state memory array 160 in response to memory access commands received from the host interface 110. Further, the memory controller 114 may perform memory management commands such as garbage collection and wear leveling. In some embodiments, the memory controller 114 may include a processor 120 for performing some or all of the memory management and memory access commands.

Figure 1C:
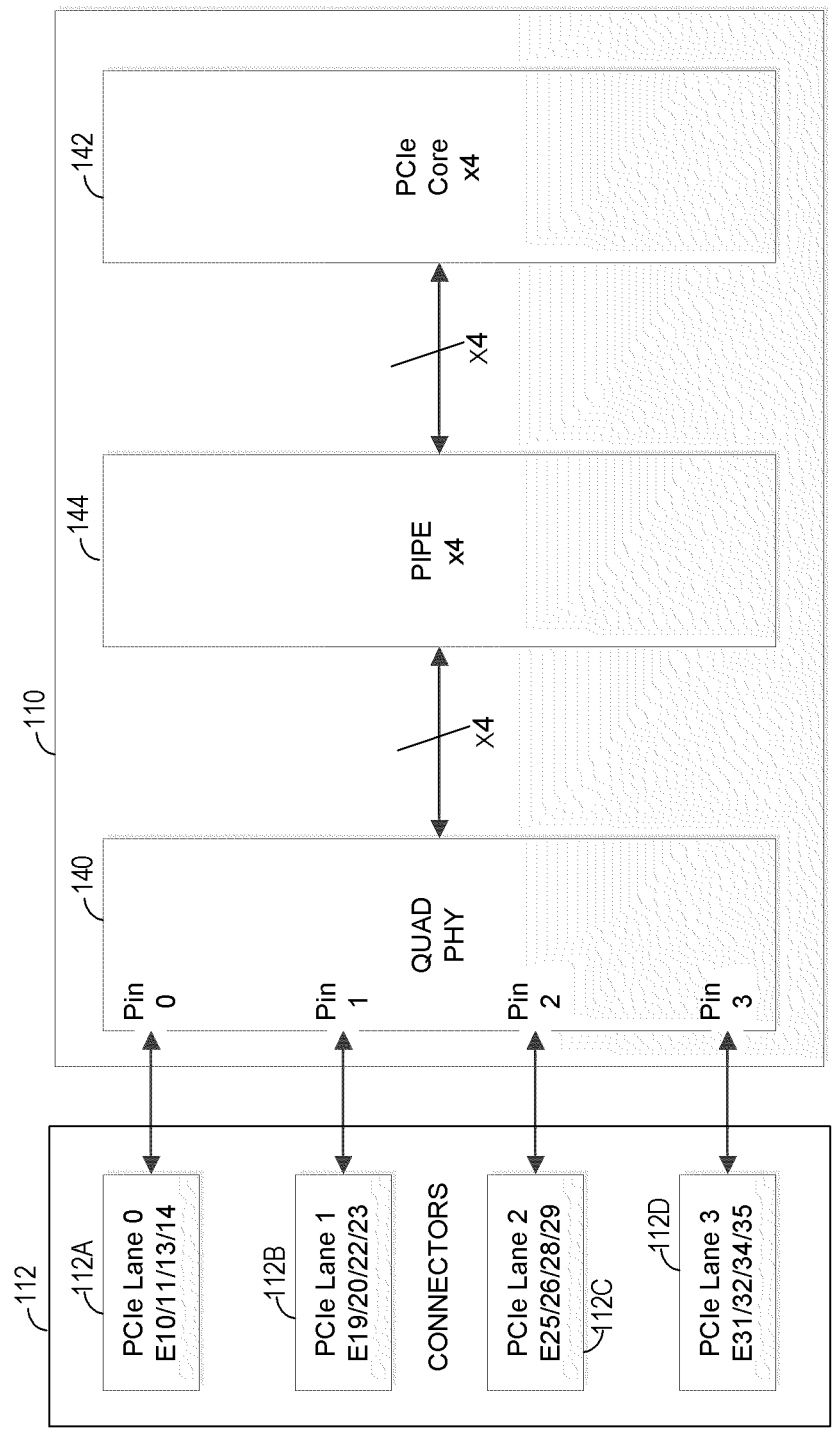
FIG. 1C is a block diagram illustrating a more detailed example of the host interface illustrated in FIG. 1B.

FIG. 1C is a block diagram illustrating a more detailed example of the host interface 110 illustrated in FIG. 1B. The host interface 110, in addition to the host processor 116 illustrated in FIG. 1B, may include a quad PHY 140 and a x4 PCIe core 142. The quad PHY 140 is a PHY that can support four lanes. Each pin of the quad PHY may communicate with a PCIe lane associated with a connector 112A-112D of the connectors 112. As illustrated in FIG. 1C, each connector 112A-112D of the connectors 112 may be a lane that includes two differential signaling pairs (e.g., E10/11 and E13/14, E19/20 and E22/23, etc.). One of the differential signaling pairs may be used for transmitting data and/or commands and one of the differential signaling pairs may be used for receiving data and/or commands. Although four connectors 112A-112D and a single quad PHY 140 is illustrated, it is possible for the number of connectors and the number of quad PHYs to differ. For example, the host interface 110 may include two quad PHYs, with each quad PHY in communication with four connectors for a total of eight connectors.

The quad PHY 140 can include any type of physical interface configured to receive signals from the connectors 112 and perform a number of signal processing operations before providing the signals to the PCIe core 142. For example, the quad PHY 140 may reshape, regenerate, filter, or perform other signal processing functions. Further, the quad PHY 140 may alter the frequency of the received signal. In some cases, the quad PHY 140 may take a serial signal and convert it to a parallel signal. For example, the quad PHY 140 may take a high-speed serial stream of data and convert it into a lower-speed parallel stream. Once the signal has been processed, the quad PHY 140 may provide the signal to the PCIe core 142.

In some embodiments, the signal may be modified to match an industry standard, such as the PHY Interface for PCI Express (PIPE) published by Intel®. Advantageously, by implementing the PIPE standard, PHYs and PCIe cores developed by different manufacturers can be configured to function with each other. In some cases, the PIPE standard may be implemented by the quad PHY 140 and the PCIe core 142. However, in other cases, an intermediary, such as the PIPE 144, may be used to modify the signals sent and received to or from the quad PHY 140 and/or the PCIe core 142 to enable successful communication between the quad PHY 140 and the PCIe core 142. Although illustrated as a separate device in the FIG. 1C, typically the PIPE 144 is a conceptual device representing the format of signals for communication between devices. In other words, the requirements of the PIPE 144 device may be implemented as part of the quad PHY 140 and the PCIe core 142 rather than as a separate component of the host interface 110.

As mentioned above, the host interface 110 may include a x4 PCIe core. The x4 PCIe core may include any type of PCIe core that can facilitate communication between a root complex and a controller, such as the memory controller 114. The PCIe core may perform a number of digital signal processing (DSP) functions to facilitate the communication. For example, the PCIe core may perform error correction, request retransmission of requests, packetize received data, establish a data link later, etc.

Example of a Multi Root Complex System

While in some cases multiple root complexes may share a PCIe core, generally, each root complex and/or processor uses or is associated with a separate PCIe core. Thus, the example presented in FIG. 1C illustrates a host interface 110 that is configured for use with a host system 102 that includes a single processor 132 and/or root complex 106.

Figure 2A:
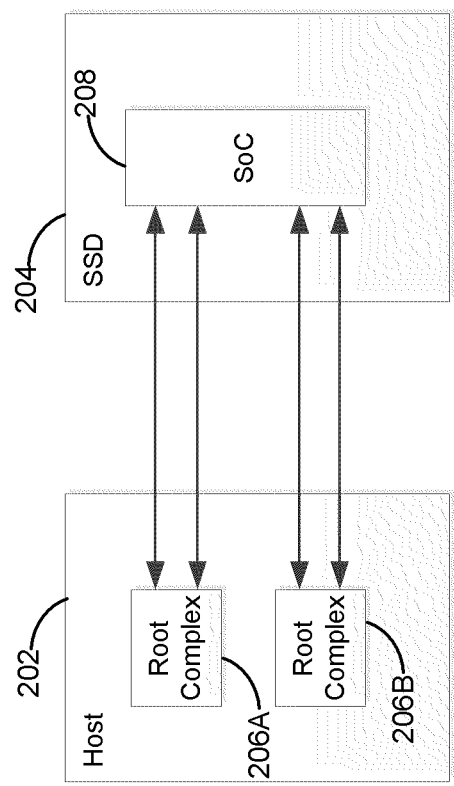
FIG. 2A is a block diagram illustrating an example of a host system with two root complexes in communication with a storage device via a pair of x2 PCIe links.

However, as illustrated in FIG. 2A, a host system 202 may include multiple root complexes.

FIG. 2A is a block diagram illustrating an example of a host system 202 with two root complexes 206A, 206B in communication with a storage device 204 via a pair of x2 PCIe links. The storage device 204 may include a SoC 208, which may have similar functionality as the SoC 108 previously described. As with the SoC 108, the SoC 208 may function as a controller for the storage device 204.

Figure 2B:
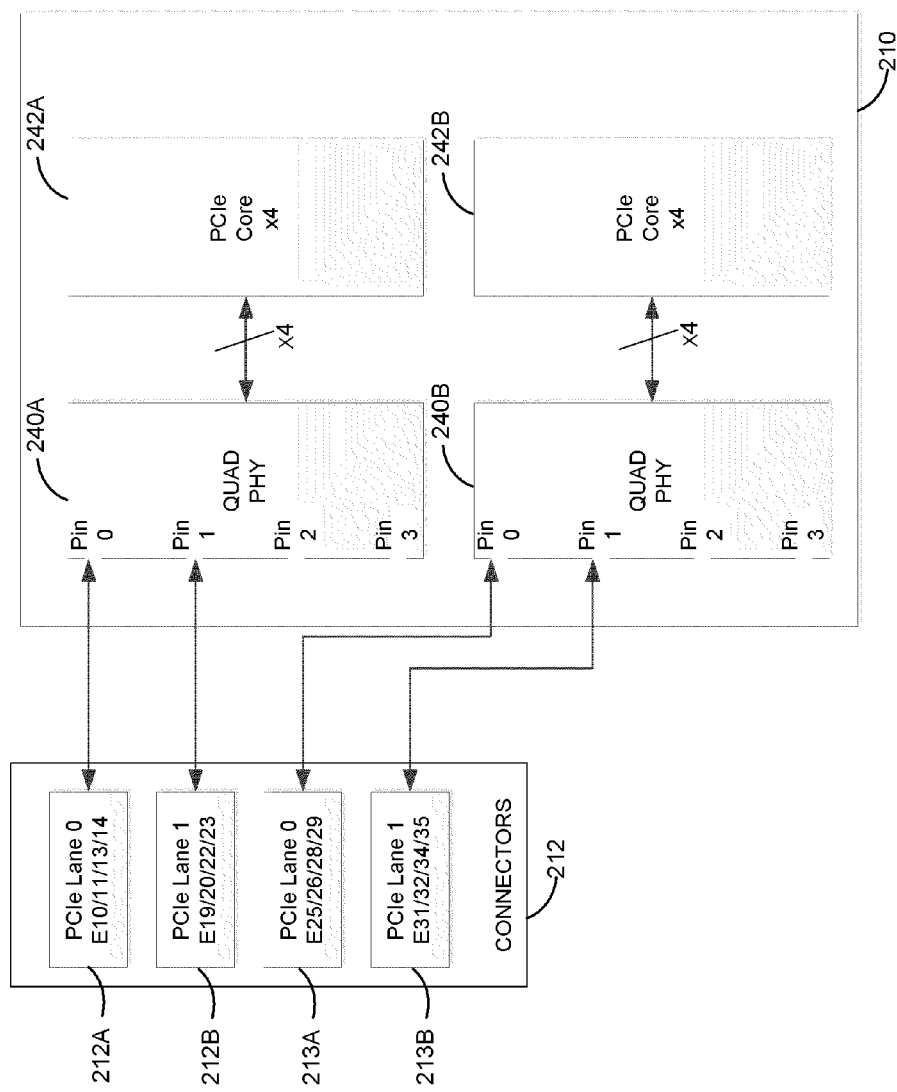
FIG. 2B is a block diagram illustrating an example of a host interface that may be included in the System on Chip (SoC) of FIG. 2A.

FIG. 2B is a block diagram illustrating an example of a host interface 210 that may be included in the System on Chip (SoC) 208 of FIG. 2A. The host interface 210 may communicate with the root complexes 206A, 206B via connectors 212, which may be used to connect the SoC 208 to the storage device 204. The connectors 212 may be physical connectors and may include some or all of the embodiments previously described with respect to the connectors 112. As with the connectors 112, the connectors 212 may include four connectors with each connector including a lane of two differential signaling pairs as described with respect to the connectors 112A-112D. However, unlike the connectors 112A-112D, the four connectors of the connectors 212 may be split into two pairs of connectors, connectors 212A, 212B and connectors 213A, 213B.

Each pair of connectors 212A, 212B and 213A, 213B may be assigned to or associated with a different root complex 206A, 206B. In other words, in some cases, each pair of connectors 212A, 212B and 213A, 213B may be configured to receive signals from and transmit signals to a different root complex 206A, 206B. Further, as illustrated in FIG. 2B, each pair of connectors 212A, 212B and 213A, 213B may communicate with a different quad PHY 240A, 240B. The connectors 212A, 212B may communicate with the quad PHY 240A and the connectors 213A, 213B may communicate with the quad PHY 240B.

Each quad PHY 240A, 240B may communicate with a x4 PCIe core 242A, 242B respectively. Thus, the root complex 206A may provide data and/or a command to the connectors 212A, 212B, which is provided to the PCIe core 242A via the quad PHY 240A. Similarly, the root complex 206B may provide data and/or a command to the connectors 213A, 213B, which is provided to the PCIe core 242B via the quad PHY 240B. Further, the PCIe cores 242A, 242B may communicate with the root complexes 206A, 206B respectively via the quad PHYs 240A, 240B and corresponding connectors 212A, 212B and 213A, 213B respectively.

As illustrated in FIG. 2B, in some cases when a host system 202 includes multiple root complexes 206A, 206B, portions of the quad PHYs 240A, 240B and the PCIe cores 242A, 242B may be underutilized or not utilized at all. For example, the pins 0 and 1 of the quad PHY 240A of FIG. 2B may be in communication with connectors 212A, 212B, but pins 2 and 3 may remain unconnected or may be terminated. Likewise, pins 2 and 3 of the quad PHY 240B may remain unconnected or may be terminated. Further, although four connections are indicated in FIG. 2B between the quad PHYs 240A, 240B and the PCIe cores 242A, 242B, only two of the connections may be utilized. In some embodiments, only two connections may be formed between the quad PHYs 240A, 240B and the PCIe cores 242A, 242B. In such cases, the ports and/or functioning blocks associated with the excess capacity of the quad PHYs 240A, 240B and the PCIe cores 242A, 242B may be deactivated, terminated, or otherwise rendered in operable, or may function but may be unused. Although not illustrated, similar to the host interface 110, the host interface 210 may include a host processor.

In certain embodiments, enabling the host interface 210 to be used with a host system 202 that includes multiple root complexes may result in wasted resources, such as energy, space, and money. Further, in some cases, using quad PHYs results in reduced flexibility with respect to the application of the host interface 210. One solution to the reduced flexibility and the wasted resources is to use PHYs of different sizes with a host interface. For example, using dual PHYs instead of quad PHYS, or in combination with quad PHYs, can reduce the amount of wasted resources and increase the flexibility of the host interface. Examples of alternative host interfaces are presented below with respect to FIGS. 3 and 5.

Example Host Interface with Dual PHYs

Figure 3:
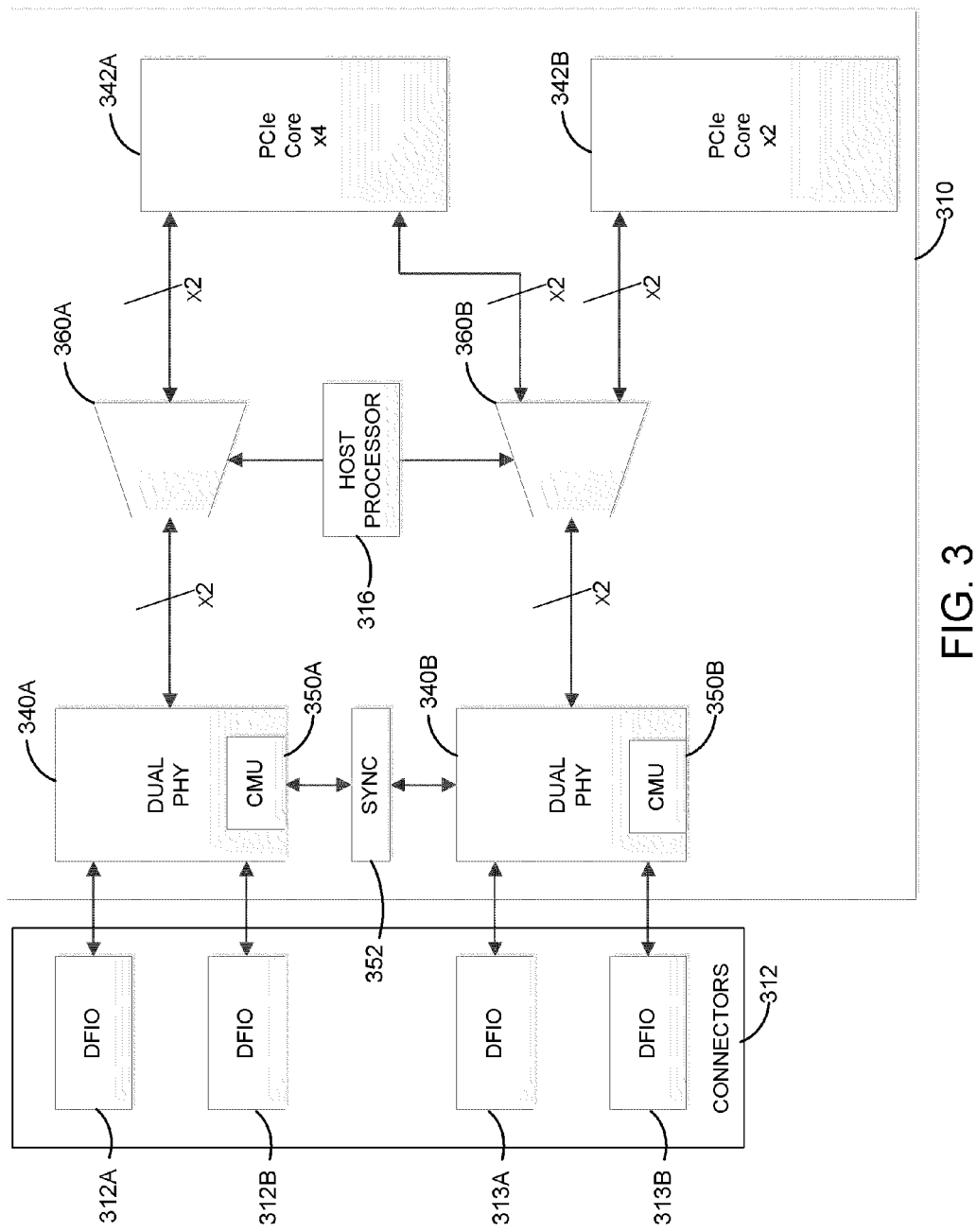
FIG. 3 is a block diagram illustrating an example of a host interface with dual physical interfaces (dual PHYs) that may be used with one or two root complexes.

FIG. 3 is a block diagram illustrating an example of a host interface 310 with dual physical interfaces (dual PHYs) 340A, 340B that may be used with one or two root complexes (e.g., root complexes 206A, 206B). The host interface 310 may include similar functionality as the host interface 210. For example, as with the host interface 210, the host interface 310 enables communication between two root complexes and two PCIe cores.

Generally, the host interface 210 is not used with a single root complex. In cases where the host interface 210 is used with a single root complex, the host interface 210 may be limited to two PCIe lanes (e.g., via the connectors 212A, 212B). However, the host interface 310 may be used with a host that includes a single root complex. Further, the host interface 310 may provide a host with a single root complex (e.g., the host 102) with access to four PCIe lanes via the connectors 312A, 312B, 313A, 313B.

The host interface 310 may communicate with one or more root complexes of the host via the connectors 312. As indicated in FIG. 3, the connectors 312 may be differential input/output connectors. As with the connectors 212, the connectors 312 may be split into two pairs of connectors, connectors 312A, 312B and connectors 313A, 313B.

Further, as with the connectors 212, each pair of connectors 312A, 312B and 313A, 313B may be configured to communicate with or associated with a different root complex (e.g., root complexes 206A, 206B). In other words, in some cases, each pair of connectors 312A, 312B and 313A, 313B may be configured to receive signals from and transmit signals to a different root complex 206A, 206B. Further, as illustrated in FIG. 3, each pair of connectors 312A, 312B and 313A, 313B may communicate with a different dual PHY 340A, 340B. The connectors 312A, 312B may communicate with the dual PHY 340A and the connectors 313A, 313B may communicate with the dual PHY 340B.

As with the host interface 210, the host interface 310 may include a pair of PCIe cores 342A, 342B. In the illustrated embodiment, the PCIe core 342A is a x4 PCIe core 342A that is capable, in some cases, of processing signals received at the host interface 310 from up to four connectors 312A, 312B, 313A, 313B. Further, the PCIe core 342B is a x2 PCIe core that is capable, in some cases, of processing signals received at the host interface 310 from up to two connectors 313A, 313B. The PCIe cores 342A, 342B in the example illustrated in FIG. 3 have been selected to enable the host interface 310 to support a single root complex accessing a x4 PCIe core, or two root complexes, each capable of accessing a separate PCIe core.

Advantageously, in certain embodiments, the host interface 310 provides greater flexibility compared to the host interface 210 because the host interface 310 can be used with both a host system that includes one root complex and a host system that includes two root complexes. Further, when used with a host system that includes a single root complex, the host interface 310 enables the root complex to use four lanes of the x4 PCIe core. Moreover, the host interface 310 uses smaller PHYs thereby wasting less resources (e.g., money, size, power) than the host interface 210 while supporting greater functionality and flexibility than the host interface 210.

FIG. 3 presents one example configuration of the host interface that uses a minimal number and size of PCIe cores while supporting both single root complex and dual root complex host systems. However, other configurations are possible. For example, both PCIe cores 342A, 342B may be x4 PCIe cores. As a second example, the PCIe core 342A may be a x4 PCIe core and the PCIe core 342B may be a x8 PCIe core.

Each dual PHY 340A, 340B includes a clock multiplier unit (CMU) 350A, 350B. The CMUs 350A, 350B can include any system capable of modifying a clock signal received externally from the host interface 310 or received externally from the dual PHYs 340A, 340B. For example the clock signal may be received from a pin input (not shown) to the host interface 310. As a second example, the clock signal may be received at the controller from an external source or from a clock generator and provided to the host interface 310. Regardless of where the clock signal is received, the CMUs 350A, 350B may modify the clock signal by increasing or decreasing the frequency of the clock signal. In some embodiments, the CMUs 350A, 350B may be omitted and/or non-active.

The host interface 310 may also include a synchronizer 352, or sync, configured to synchronize the clock signal provided to the dual PHYs 340A, 340B. In some embodiments, the synchronizer 352 may synchronize the clock signal provided to the dual PHYs 340A, 340B by controlling the CMUs 350A, 350B. Controlling the CMUs 350A, 350B may include synchronizing the operation of the CMUs 350A, 350B. Alternatively, the synchronizer 352 may synchronize the clock signal by selecting a CMU (e.g., the CMU 352A) to modify the clock signal for both dual PHYs 350A, 350B and by deactivating the non-selected CMU (e.g., the CMU 352B). In some cases, the synchronized clock signal may be provided to other devices included in the host interface 310, such as the PCIe cores 342A, 342B and the host processor 316. In some embodiments, the synchronizer 352 may be omitted and/or non-active. For example, in cases where the host system includes two root complexes, synchronizing the clock signals may be unnecessary as each root complex may provide commands/data asynchronously. However, in some cases, despite multiple root complexes functioning asynchronously from each other, the synchronizer 352 may still synchronize the clock signals and/or CMUs 350A, 350B to maintain synchronous memory access of non-volatile solid state memory array(s).

With further reference to FIG. 3, the host interface 310 may include one or more selectors and/or multiplexors 360A, 360B. The selectors 360A, 360B direct a signal received from the dual PHYs 340A, 340B, respectively, to the selected PCIe core 342A, 342B. As illustrated in FIG. 3, signals received from the dual PHY 340B may be provided to either the PCIe core 342A or the PCIe core 342B based, at least in part, on a selector signal received at the selector 360B from the host processor 316. Signals from the dual PHY 340A may be provided to the PCIe core 342A.

As illustrated by the single connection between the selector 360A and the PCIe cores, in some cases, signals from the dual PHY 340A are provided to the PCIe core 342A regardless of a selector signal. In such cases, the host processor 316 may not communicate with the selector 360A. Further, in some such cases, the host interface 310 may not include the selector 360A. However, in other cases, as illustrated in FIG. 3, the selector 360A is included regardless of the selection being from a set of PCIe cores of size one. Advantageously, in certain embodiments, including the selector 360A enables the host interface 310 to maintain an equal or substantially equal communication latency between the dual PHY 340A and the PCIe core 342A, and the dual PHY 340B and the PCIe core 342B. In some alternative embodiments, the selector 360A may be replaced by a latency block, which may be created from one or more delay elements (e.g., flip flops), that is configured to provide an equal or substantially equal amount of latency as is introduced into the signal path between the dual PHY 340B and the PCIe cores 342A, 342B by the selector 360B.

The host processor 316 may generate or provide the selection signal to the selectors 360A, 360B based on firmware, which may be pre-installed or pre-configured. In some cases, an external signal provided to the host interface 310 may be provided as the selector signal to the selectors 360A, 360B. Alternatively, the external signal may be used by the host processor 316 to determine the selector signal. In some embodiments, the selector signal may be automatically determined in response to the host system in communication with the host interface 310. For example, if the host system includes one root complex, the host processor 316 may provide a selector signal to the selector 360B causing the selector to provide signals received from the dual PHY 340B to the PCIe core 342A. Alternatively, if the host system includes two root complexes, the host processor 316 may provide a selector signal to the selector 360B causing the selector to provide signals received from the dual PHY 340B to the PCIe core 342B. In some cases, the host interface 310 is preconfigured. In such cases, the PCIe core that receives signals from a PHY does not change during operation.

In some such cases, regardless of the number of root complexes included with the host, the selector signal will not change. For example, suppose that the host interface 310 has been preconfigured for use with a host that includes two root complexes. In such a case, signals received from one root complex will be communicated to connectors 312A, 312B, on to the dual PHY 340A, and then on to the PCIe core 342A via the selector 360A. Similarly, signals received from the second root complex will be communicated to connectors 313A, 313B, on to the dual PHY 340B, and then on to the PCIe core 342B via the selector 360B. Continuing the above example, now suppose that a host with a single root complex is connected to an SSD with the host interface 310. In such a case, the connectors 312A, 312B may receive signals from the root complex, but the connectors 313A, 313B may receive no signals and the dual PHY 350B and the PCIe core 342B may not be utilized. In other cases, both PHYs 340A, 340B and PCIe cores 342A, 342B may receive instructions and data from the single root complex.

Example PCIe Card

Figure 4:
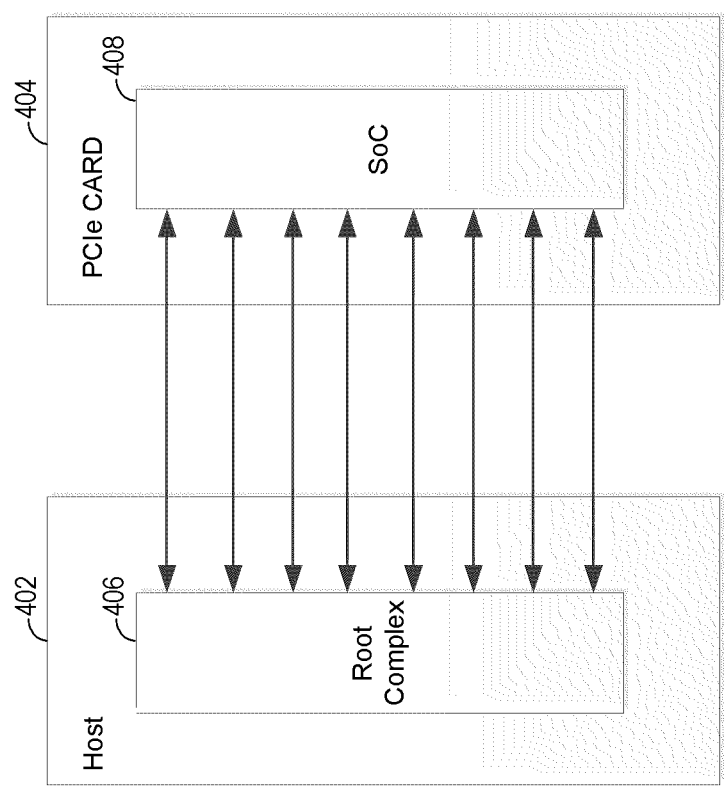
FIG. 4 is a block diagram illustrating an example of a host system in communication with a PCIe card via a x8 PCIe link.

Embodiments of the present disclosure so far have been described with respect to a storage device such as a solid state drive. However, the disclosure is not limited as such. The present disclosure can be applied to other PCIe based devices, such as a PCIe card (e.g., a PCIe graphics card, a PCIe network card, a PCIe USB card, etc.). FIG. 4 is a block diagram illustrating an example of a host system 402 in communication with a PCIe card 404 via a x8 PCIe link.

As with the storage device 104, the PCIe card 404 may include a SoC 408 that communicates with a root complex 406 of the host system 402. The SoC 408 may be configured similarly to the SoC 108. In other words, the SoC 408 may include a host interface and a controller, which may or may not be a memory controller based on the type of PCIe card. Further, the host interface of the SoC may be configured to use different size PHYs thereby enabling the PCIe card 404 to be utilized with other host systems that may include multiple root complexes. An example, of the host interface for an SoC 408 of a PCIe card 404 that may be used with multiple root complexes is illustrated in FIG. 5.

Example Host Interface for a PCIe Card

Figure 5:
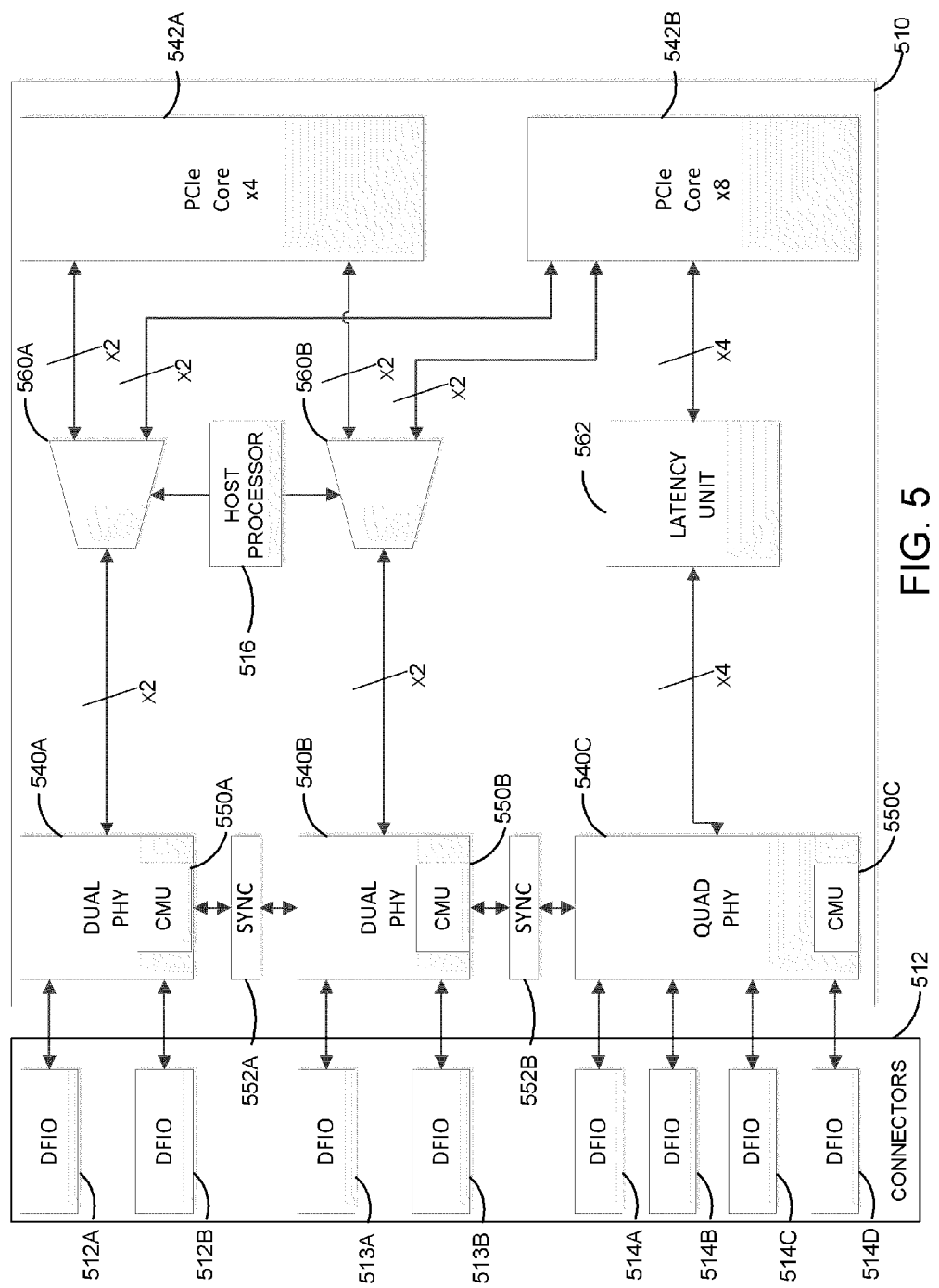
FIG. 5 is a block diagram illustrating an example of a host interface with a combination of dual PHYs and a quad PHY that may be used with one or two root complexes.

FIG. 5 is a block diagram illustrating an example of a host interface 510 with a combination of dual PHYs 540A, 540B and a quad PHY 540C that may be used with one or two root complexes. The host interface 510 may include similar functionality as the host interfaces 310, 210. For example, as with the host interfaces 210, 310, the host interface 510 enables communication between two root complexes and two PCIe cores.

Further, as with the previously described host interfaces, the host interface 510 may communicate with one or more root complexes via a set of connectors 512. The connectors 512 may be divided into a number of sets of connectors based on a number of root complexes of the host system and/or PHYs included in the host interface 510. For example, the connectors 512 may include connectors 512A, 512B associated with a dual PHY 540A and connectors 513A, 513B associated with a dual PHY 540B. Both pairs of connectors 512A, 512B and 513A, 513B may be configured to communicate with a first root complex. The connectors 514A-514D, which may be associated with a quad PHY 540C may be configured to communicate with a second root complex. Alternatively, connectors 512A, 512B, 513A, 513B, 514A-514D may be configured to communicate with a single root complex.

Further, the host interface 510 may include some or all of the components as previously described with respect to the host interfaces 210, 310. For example, as illustrated in FIG. 5, the host interface 510 may include a number of PHYs including the dual PHYs 540A, 540B and the quad PHY 540C. Each PHY 540A, 540B, 540C may include a CMU 550A, 550B, 550C respectively. The CMUs 550A-550C may be configured to multiple or modify a clock signal received at each of the PHYs 540A-540C. As with the host interface 310, some or all of the CMUs 550A-550C may or may not be active based on a number of factors, such as the number of root complexes of the host system and/or the CMU selected as a master CMU. The master CMU may control modification, or multiplication, of clock signals for each PHY. In some cases the remaining CMUs may be inactive. In other cases, the remaining CMUs may be slave CMUs that modify clock signals for corresponding PHYs based on instructions from the master CMU, which may itself receive instructions or be controlled by a synchronizer.

As with the host interface 310, the host interface 510 may include synchronizers 552A, 552B for synchronizing the clock signals received at the PHYs 540A-540C. Although two synchronizers are illustrated in FIG. 5, in some embodiments, the host interface 510 may include a single synchronizer that is configured to synchronize some or all of the CMUs 550A-550C and/or clock signals received at the PHYs 540A-540C. The synchronizer can synchronize the CMUs 550A-550C and/or clock signals of the PHYs 540A-540C using some or all of the previously described processes with respect to the synchronizer 352. For example, the synchronizers 552A, 552B may synchronize the clock signals of all three PHYs 540A-540C, when a single root complex is used in the host system. Alternatively, such as in some cases when two root complexes are included in the host system, the root complex 552A may synchronize the clock signals of the PHYs 540A, 540B. In some such cases, the synchronizer 552B may control the CMU 550C of the PHY 540C. Alternatively, the synchronizer 552B may be inactive.

With further reference to FIG. 5, the host interface 510 may include a pair of PCIe cores 542A, 542B. By including two PCIe cores 542A, 542B, the PCIe card (or SSD card) that includes the host interface 510 can be utilized with systems that include one or two root complexes. In some embodiments, the host interface 510 may be configured to include an alternative number of PCIe cores. For example, the host interface 510 can be configured with three PCIe cores, thereby enabling the host interface 510 to be used with hosts that include three root complexes. In such an example configuration, one or more of the selectors may be configured to select between three PCIe cores. Further, although the PCIe cores 542A, 542B are illustrated as x4 and x8 cores respectively, other size cores are possible. For example, both PCIe cores 542A, 542B could be x8 cores.

As previously indicated, the host interface 510 may include a number of selectors 560A, 560B, which may select between PCIe cores 542A, 542B based on a control signal, which may be received from the host processor 516 or from an external control signal. Further, the host interface 510 may include a latency unit 562 that is configured to provide the same or substantially similar latency between the quad PHY 550 and the PCIe core 542B as is provided by the selectors 560A, 560B. In some cases, the latency unit 562 may include any components or devices that can add to or control latency in a signal. For example, the latency unit may include one or more flip flops or latches. In some embodiments, as described with respect to FIG. 3, the latency unit 562 may be a selector that selects from a single PCIe core, or which has its selection function deactivated.

Although not illustrated, in some embodiments, the latency unit 562 may receive a control signal or other signal to facilitate the latency unit 562 maintaining a latency consistent with the latency introduced by one or more of the selectors 560A, 560B. This control signal, or other signal, may be provided by the host processor 516 or otherwise. In some cases, the latency unit may receive signals from before and after one or the sectors enabling the latency unit to determine an appropriate latency to apply to a signal received from the quad PHY 540C. For instance, if the latency unit determines that a previous instruction provided to the selector 560B took four clock cycles to be passed through the selector 540B to the PCIe core 542B, the latency unit 562 may introduce a latency of four clock cycles to signals received from the quad PHY 540C.

CONCLUSION

Disclosed systems and methods enable a host interface to be utilized with multiple applications. The host interface can include multiple PHY sizes and configurations that enable a PCIe based solid state drive and/or PCIe card to be used with hosts with varying numbers of processors and/or root complexes. Further, the host interface can include multiple PCIe cores with varying sizes and configurations that enable a PCIe based solid state drive and/or PCIe card to be used with hosts with varying numbers of processors and/or root complexes. Accordingly, increased flexibility and reduced cost (e.g., monetary cost, energy cost, space cost) is obtained for designing and manufacturing different SSD and PCIe card applications and configurations.

Other Variations

Those skilled in the art will appreciate that in some embodiments, other approaches and methods can be used. For example, in some embodiments, each PHY may be associated with its own PCIe core and multiple PHYs may be associated with a single root complex. In such a case, the selectors may be optional. Additional system components can be utilized, and disclosed system components can be combined or omitted. Depending on the embodiment, certain of the steps described above may be removed, others may be added.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the described examples and processes may be performed in different order, removed, and others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A storage device, comprising:
   a plurality of non-volatile solid state memory devices;
   a set of Peripheral Component Interconnect Express (PCIe) connectors configured to receive memory access commands from a host system; and
   a controller configured to receive and process memory access commands for accessing the plurality of non-volatile solid state memory devices, the controller comprising a host interface, the host interface comprising:
      a plurality of physical interfaces (PHYs), each PHY configured to communicate with a subset of PCIe connectors from the set of PCIe connectors, wherein at least one of the plurality of PHYs comprises a dual PCIe PHY, thereby enabling the host interface to be used with multiple PCIe topologies; and
      one or more PCIe cores configured to process signals passing through the plurality of PHYs.

2. The storage device of claim 1, wherein each PHY comprises a clock multiplier unit configured to multiply a frequency of a clock signal received at the host interface while maintaining synchronicity with a provider system of the clock signal.

3. The storage device of claim 2, wherein the host interface further comprises a synchronizer configured to synchronize a clock signal of each PHY.

4. The storage device of claim 3, wherein the synchronizer is configured to synchronize the clock signal of each PHY by:
   selecting a PHY from the plurality of PHYs;
   synchronizing the clock signal of each PHY based at least partially on the clock multiplier unit of the selected PHY; and
   deactivating the clock multiplier unit of each remaining PHY from the plurality of PHYs.

5. The storage device of claim 1, wherein the host interface further comprises a set of selectors, each selector associated with a corresponding PHY from the plurality of PHYs.

6. The storage device of claim 5, wherein at least one selector from the set of selectors is configured to select a PCIe core from the one or more PCIe cores to receive a data/command signal from the corresponding PHY based at least partially on a selector signal provided to the selector.

7. The storage device of claim 6, wherein the host interface further comprises a host processor, the host processor configured to provide the selector signal to the selector.

8. The storage device of claim 5, wherein at least one selector from the set of selectors is associated with one PCIe core from the one or more PCIe cores, the at least one selector configured to maintain a degree of latency for a signal path associated with the at least one selector.

9. The storage device of claim 5, wherein the host interface further comprises a latency unit associated with a first PHY from the plurality of PHYs, the latency unit configured to maintain a first signal latency between the first PHY and a first corresponding PCIe core from the one or more PCIe cores that matches a second signal latency, the second signal latency associated with a signal latency between a second PHY from the plurality of PHYs and a second corresponding PCIe core from the one or more PCIe cores.

10. The storage device of claim 1, wherein the set of PCIe connectors comprise a set of differential input/output connectors.

11. The storage device of claim 1, wherein each PCIe core from the one or more PCIe cores is associated with a separate root complex of a host system.

12. The storage device of claim 1, wherein the controller is a solid state driver controller.

13. The storage device of claim 1, wherein at least one PHY is not a dual PCIe PHY.

14. The storage device of claim 1, wherein the controller further comprises a memory controller configured to communicate with the host interface and the plurality of non-volatile solid state memory devices.

15. A controller for a Peripheral Component Interconnect Express (PCIe) card, the controller comprising:
   a plurality of physical interfaces (PHYs), each PHY configured to communicate with a subset of PCIe connectors from a set of PCIe connectors, wherein at least one PHY supports a different number of PCIe connectors than at least one other PHY, thereby enabling the controller to be used with multiple PCIe card topologies; and
   one or more PCIe cores configured to communicate with the plurality of PHYs.

16. The controller of claim 15, wherein each PHY comprises a clock multiplier unit configured to modify a clock signal received at the controller while maintaining synchronicity with a provider system of the clock signal.

17. The controller of claim 16, further comprising a synchronizer configured to synchronize a clock signal of each PHY.

18. The controller of claim 17, wherein the synchronizer is configured to synchronize the clock signal of each PHY by:
selecting a PHY from the plurality of PHYs;
synchronizing the clock signal of each PHY using the clock multiplier unit of the selected PHY; and
deactivating the clock multiplier unit of each remaining PHY from the plurality of PHYs.

19. The controller of claim 15, further comprising a set of selectors, each selector associated with a corresponding PHY from the plurality of PHYs.

20. The controller of claim 19, wherein at least one selector from the set of selectors is configured to select a PCIe core from the one or more PCIe cores to receive a data/command signal from the corresponding PHY based at least partially on a selector signal provided to the selector.

21. The controller of claim 19, wherein at least one selector from the set of selectors modifies a signal latency of a signal communicated between a PHY from the plurality of PHYs and a corresponding PCIe core from the one or more PCIe cores without enabling the selection of an alternative PCIe core from the one or more PCIe cores.

22. A controller comprising:
a plurality of physical interfaces (PHYs), each PHY configured to communicate with a subset of serial interface connectors from a set of serial interface connectors, wherein at least one PHY supports a different number of serial interface connectors than at least one other PHY; and
one or more processing cores configured to communicate with the plurality of PHYs.

23. The controller of claim 22, wherein each PHY comprises a clock multiplier unit configured to modify a clock signal received at the controller while maintaining synchronicity with a provider system of the clock signal.

24. The controller of claim 23, further comprising a synchronizer configured to synchronize a clock signal of each PHY.

25. The controller of claim 24, wherein the synchronizer is configured to synchronize the clock signal of each PHY by:
selecting a PHY from the plurality of PHYs;
synchronizing the clock signal of each PHY using the clock multiplier unit of the selected PHY; and
deactivating the clock multiplier unit of each remaining PHY from the plurality of PHYs.

26. The controller of claim 22, further comprising a set of selectors, each selector associated with a corresponding PHY from the plurality of PHYs.

27. The controller of claim 26, wherein at least one selector from the set of selectors is configured to select a processing core from the one or more processing cores to receive a data/command signal from the corresponding PHY based at least partially on a selector signal provided to the selector.

28. The controller of claim 26, wherein at least one selector from the set of selectors modifies a signal latency of a signal communicated between a PHY from the plurality of PHYs and a corresponding processing core from the one or more processing cores without enabling the selection of an alternative processing core from the one or more processing cores.

* * * * *